Patented Aug. 22, 1944

2,356,282

UNITED STATES PATENT OFFICE 2,356,282

PROCESS OF STABILIZATION OF POLYVINYL ALCOHOL

Gelu Stoeff Stamatoff, Rutherford, N. J., assignor to E. I. du Pont de Nemours & Company, Wilmington, Del., a corporation of Delaware No Drawing. Application November 15, 1941, Serial No. 419,319

6 Claims. (Cl. 260—90)

This invention relates to the stabilization of polyvinyl alcohol, particularly of that which has been prepared by alcoholysis of a polyvinyl ester with the assistance of an acid catalyst.

The term "polyvinyl alcohol" herein is to be interpreted as including the products of hydrolysis or alcoholysis of polyvinyl esters carried to the extent of about 92 per cent or more, and thus, in the case of such products derived from polyvinyl acetate, those in which the residual content of polyvinyl acetate is not in excess of about 15 per cent. Because polyvinyl acetate is at present almost invariably the polyvinyl ester used for the preparation of polyvinyl alcohol, it will be the only individual ester mentioned hereinafter, but it is to be understood the invention relates identically to polyvinyl alcohols prepared analogously from other polyvinyl esters.

Polyvinyl alcohol made by alcoholysis of polyvinyl acetate, e. g. in methanol or in ethanol, has not been readily stabilized in the form of the particles in which it is thereby produced. It has been, for example, difficult to stabilize such a polyvinyl alcohol to the extent that it will satisfactorily pass a conventional test for permanence of color and solubility toward heat, which test comprises heating a sample of the material in air at 135° C. for 16 hours. Improperly or inadequately stabilized polyvinyl alcohol discolors in this test to more than the very limited extent which is regarded as tolerable, and also suffers impairment of its solubility in water.

It is an object of the present invention to provide a simple, inexpensive and effective procedure for the neutralization of acid catalyst in a polyvinyl alcohol which has been prepared by alcoholysis of a polyvinyl ester, ordinarily polyvinyl acetate, such procedure being applied to the material while in the form of discrete particles. A further object is the stabilization of polyvinyl alcohol, through such neutralization, to the extent that it will acceptably pass the test described above.

A further object of the invention is the production of polyvinyl alcohol which can be dried rapidly without discoloration or impairment of solubility, and thus the production of a dry polyvinyl alcohol substantially free from color and soluble in water.

Other objects will appear hereinafter.

In accordance with the invention, these objects are accomplished by a process which comprises treating polyvinyl alcohol, in the form of discrete particles resulting from the alcoholysis of a polyvinyl ester, in a bath essentially comprising a lower aliphatic alcohol such as methanol or ethanol, and water, in proportions presently to be specified and having an alkalinity produced by hydroxyl ions resulting from solution therein of an alkaline substance selected from the hydroxides of sodium and potassium and their salts with weak acids, then, if necessary, altering the proportion of water in the bath before separating the polyvinyl alcohol therefrom, so that the particles of the latter will not adhere to each other when packed together by filtration, and leaving in and on the particles of polyvinyl alcohol sufficient of the alkaline substance so that the polyvinyl alcohol, after having been dried, will have an alkalinity within limits presently to be specified.

During the treatment of the polyvinyl alcohol, the mixture of alcohol and water constituting the stabilizing bath may contain a proportion of water between 0% and that proportion which will cause the mixture to have pronounced solvent action upon the polyvinyl alcohol. If the proportion of water in the mixture is at this stage more than 35 per cent of the weight of the mixture, it must be reduced at least to that percentage by appropriate addition of alcohol before the polyvinyl alcohol is separated from the bath.

The alkalinity of dried polyvinyl alcohol is designated throughout the specification as the number of cubic centimeters of 0.01 normal hydrochloric acid required to neutralize 100 grams of resin. This value is readily determined by neutralizing a solution of 5 grams of the polyvinyl alcohol in 200 cubic centimeters of water in a titration, using bromo phenyl blue as the indicator, with 0.01 normal hydrochloric acid and multiplying the number of cubic centimeters required for this titration by 20.

In order that the polyvinyl alcohol shall satisfactorily pass the heat-stability test previously mentioned, its alkalinity must be within certain limits. If its alkalinity is too high, it will suffer discoloration, in the test, to a hue of chocolate brown, faint or pronounced according to the extent of the excess of alkalinity. If its alkalinity is too low, the polyvinyl alcohol will suffer discoloration, in the test, to a hue of reddish brown.

The upper limit of alkalinity of the dried product is a function of the percentage of water in the treating bath, being the higher the less the percentage of water. Over the operative range of water content (W), between 0% and 35%, this upper limit (A) may be approximated by the equation—

$$\log A = 2.48 - 0.008 W$$

wherein W is the percent by weight of water in the bath.

Briggian (base 10) logarithms are used in the above equation and throughout the specification and claims.

The lower limit of alkalinity of the dried product is less clearly influenced by the water content of the bath, although it tends to decrease slightly with increase in the percentage of water in the bath. Since, however, this relationship is ill-defined, the lower limit of alkalinity of product is practically stated as about 75 for all values of water content of bath between 0% and 35%. Through the operation of uncontrollable minor variables it may be found that some lots of polyvinyl alcohol with alkalinity slightly above 75 will not be entirely satisfactory with respect to the heat-stability test, particularly when the water content of the bath has been low, and that some lots with alkalinity slightly below 75 will be quite satisfactory, particularly when the water content has been relatively high.

The equation given above for determining the upper limit of alkalinity is perhaps not a scientifically accurate and true statement of the relation between A and W, but the equation does, however, approximate the empirical facts and thus furnishes a working definition of the relation between water content of bath and alkalinity of product within the operative range of the former—a relation that cannot be defined except in mathematical language.

The employment of water with the alcohol in the stabilizing bath is not essential to the production of a dried polyvinyl alcohol of satisfactory heat-stability, but is desirable because it promotes superior heat-stability. On the other hand, the use of very much water, even within the operative limit of content of water, tends to add to the cost of the procedure by increasing the volume of liquid which must be rectified for re-use and also may result in some loss of polyvinyl alcohol by solution. The preferred range of percentage of water in the mixture of alcohol and water is between 10 and 20, by weight, and it is preferred to regulate the alkalinity of the bath, and the rinsing mixture if the latter is used, so the dried polyvinyl alcohol has an alkalinity between 80 and 100, this range of alkalinity being preferred even when the water content of the bath is not within the stated preferred range.

The customary upper operative limit of water content, i. e., 35% by weight of the mixture of methanol (or ethanol) and water, is that above which the solvent action of the water will cause the particles of polyvinyl alcohol to become sticky to the extent that they will tend to agglomerate in the course of the subsequent separation of the polyvinyl alcohol from the bath by means of a centrifuge or filter. For this same reason, any rinsing of the polyvinyl alcohol after its separation from the liquor is to be done with an alcohol containing not more than this maximum percentage of water.

A water content higher than 35% can be tolerated during the actual treatment, and particularly if the batch is being stirred, since the tendency of the particles to stick together is, at this stage, not exaggerated by the packing action of a centrifuge or filter. Therefore, if, for any reason, it be found expedient or desirable to use a bath containing more than this proportion of water, this may be done but it will then be necessary afterward to fortify the bath with alcohol, up at least to the 65% limit, before attempting to effect a separation of the polyvinyl alcohol from the bath. Normally, such a procedure will not be found expedient, but it lies within the broad scope of the invention.

The absolute limit upon the content of water in the bath during the treatment is that content above which the mixture will exert upon the polyvinyl alcohol a solvent action strong enough to cause the particles of it to coalesce. What this maximum is will depend upon the character of the polyvinyl alcohol in question, and particularly upon its residual content of ester. It will be in the vicinity of 45% to 60%.

If water is normally present in the alcohol, as in ethanol of the common grade, it is to be counted as part of the water content to be provided in accordance with the invention.

The desired alkalinity of the bath is conveniently provided by running into the bath an appropriate quantity of aqueous solution of sodium hydroxide or of one of the inexpensive salts of sodium with a weak acid, e. g. sodium carbonate, sodium acetate. Corresponding compounds of potassium are equivalent.

The temperature of the bath during the stabilizing treatment may conveniently be in the vicinity of room temperature, but is not a critical factor. It is to be noted, however, that if a temperature much in excess of room temperature is used, the upper limit of proportion of water in the bath will be slightly less than in a similar batch treated at room temperature.

The time required for the treatment cannot be definitely specified since it will depend upon several procedural factors which are variable within the scope of the invention—namely, the percentage of water in the bath, its temperature and its alkalinity, and the effectiveness of agitation during the steeping—and also upon the character of the polyvinyl alcohol being treated—the porosity and shape of its particles, their dimensions, the solubility of the polyvinyl alcohol, which is dependent upon the character and percentage of residual ester groups, and, perhaps, even its molecular weight. But the time required for effecting stabilization to a desired degree by the method of the invention will readily be established on the basis of simple tests.

In commercial practice, the time necessarily consumed in making the addition of neutralizing reagent and titrating to check the alkalinity will ordinarily be long enough to provide the necessary duration of contact with the bath. The content of acid of the polyvinyl alcohol being known, at least approximately, either from experience or by actual determination, there is added to the bath a quantity of neutralizing agent somewhat less than that which should provide the desired alkalinity. Then a sample of the bath is titrated, and on the basis of the result a further addition of neutralizing agent is made which will bring the alkalinity of the bath to the desired level.

The alkalinity of the dried polyvinyl alcohol, as defined above, will be governed (1) by the content of alkaline substance in the liquid which the particles of polyvinyl alcohol carry with them to the drier, (2) by the amount of such liquid carried by the particles into the drier and (3) by the amount of unneutralized acid, if any, contained within the particles. Correspondingly, the alkinity of the dried product is subject to control (1) through the alkalinity of the bath and the thoroughness of any washing of the particles following the stabilizing treatment, (2) through the degree of completeness of separation of the particles from the liquid (bath or wash liquid) in preparation for drying—e. g. by centrifuge, suction filter, or the like—and (3) through the degree of completeness of the neutralization of residual acid during the stabilizing treatment. It will be apparent that the procedure of control whereby to achieve a predesignated alkalinity of product cannot be specifically prescribed, but that this control can be worked out readily on the basis of simple experimentation.

In practice, the most important factor in the control of the alkalinity of the dried product is the alkalinity of the bath. It is desirable to avoid the necessity of washing the polyvinyl alcohol after its separation from the bath. If washing is to be avoided, then it is obviously necessary that the alkalinity of the bath be made such that the polyvinyl alcohol, after being separated and dried, will have an alkalinity within the stated range. The method of separation of the solid particles from the steeping bath must be taken into account, in that it determines the proportion of liquor carried by the polyvinyl alcohol entering the drier and depositing its content of alkaline substance upon the particles during the drying.

The following examples in which all proportions are given by weight unless otherwise stated, illustrate specific embodiments of the invention.

Example 1

Polyvinyl alcohol made by alcoholysis of polyvinyl acetate in methanol, with the aid of sulphuric acid as catalyst, is separated from the reaction batch by means of a centrifuge, and washed with methanol. It is in the form of discrete particles.

100 parts (dry weight) of this polyvinyl alcohol, carrying with it a residue of 67 parts of the methanol, and 0.3 part of sulphuric acid, is suspended in a mixture of methanol, 358 parts, and water, 75 parts, to provide a bath of composition methanol 85%, water 15%.

To this bath, containing the polyvinyl alcohol in suspension, and under agitation is added sodium hydroxide (in aqueous solution) in an amount which will fall slightly short of neutralizing the bath to an endpoint with bromphenol blue as indicator. Then, on the basis of a titration of a sample of the bath with standard alkali, a further amount of sodium hydroxide is added to provide an alkalinity of 15–20 (i. e., the bath thus treated would require, per 100 grams of bath, the addition of 15–20 cc. of 0.01 normal hydrochloric acid to produce an endpoint with bromphenol blue as indicator). The time elapsed during the treatment of the polyvinyl alcohol in the bath is about one hour.

The polyvinyl alcohol is now separated by means of a centrifuge, and is then dried at 80–90° C.

The dried product has an alkalinity of 85. It is substantially free from color, and completely soluble in water. A specimen of it heated in air at 135° C. for 16 hours suffers substantially no impairment of color.

Example 2

The procedure is the same as in Example 1, except that the polyvinyl alcohol is not washed with methanol before being stabilized. As a result, its content of acid is higher, and more sodium hydroxide is needed to produce the same alkalinity in the bath. Also, the bath contains a minor percentage of methyl acetate which has formed a part of the residual alcoholysis liquor.

Example 3

Polyvinyl alcohol from the alcoholysis reaction is washed with methanol and treated in a bath of methanol, 85 parts, and water, 15 parts, at an alkalinity of 140. It is centrifuged and divided into four portions.

Portion A is dried directly; B is washed once with methanol and dried; C washed twice and dried; D washed three times and dried. The results show the bad effect of an alkalinity of product which is too high (as in A) or too low (as in D):

| Portion | Alkalinity of dried product | Color after heating in air at 135° C. for 16 hours. |
| --- | --- | --- |
| A | 340 | Brown. |
| B | 153 | Off-white. |
| C | 80 | White. |
| D | 64 | Light brown. |

Example 4

Polyvinyl alcohol prepared by ethanolysis is separated from the liquor of ethanol and ethyl acetate, and rinsed with ethanol to reduce its content of ethyl acetate.

It is then suspended in a mixture of ethanol and water such as to provide, in admixture with the residual ethanol, a bath of ethanol, 85 parts, and water, 15 parts. By addition of sodium hydroxide this bath is brought to an alkalinity of 20. After about an hour of contact with the bath, the polyvinyl alcohol is separated in a centrifuge and then dried. The dried product has an alkalinity of 105 and is only very slightly discolored by being heated in air at 135° C. for 16 hours.

Example 5

Polyvinyl alcohol is separated from the alcoholysis bath, washed with methanol, and treated in a bath of methanol having an alkalinity of 68. It is separated and dried. The dried product has an alkalinity of 208 and is heat-stable.

Example 6

Polyvinyl alcohol is held for one hour in contact with a bath of methanol of alkalinity 110. It is separated and dried. The dried product has an alkalinity of 265 and is slightly discolored by being heated in air at 135° C. for 16 hours.

Example 7

Polyvinyl alcohol from the alcoholysis batch is washed with methanol and then treated in a bath of methanol 95, water 5 having an alkalinity of 130. It is separated, washed with methanol, and dried.

The alkalinity of the dried product is 86. A sample of it heated in air at 135° C. for 16 hours is still substantially colorless.

Example 8

Polyvinyl alcohol is stirred in a bath of ethanol, 92 parts, and water, 8 parts, at an alkalinity of 160. It is separated, washed with ethanol of ordinary commercial strength, and dried. The product has an alkalinity of 120 and good heat-stability.

Example 9

Polyvinyl alcohol is treated in a bath of methanol, 90 parts, and water, 10 parts, at an alkalinity of 135, then separated, washed with methanol, and dried. The dried product has an alkalinity of 77, and is only slightly discolored by being heated in air at 135° C. for 16 hours.

Example 10

Polyvinyl alcohol, 40 parts (dry weight), carrying methanol, 15 parts, and acid (as sulphuric acid) 0.12 part, is suspended in methanol, 60 parts, and water, 20 parts. The bath, of methanol-water ratio 79:21, is established and maintained at an alkalinity of 190 by means of sodium acetate. The bath is stirred at room temperature for about 60 minutes. The polyvinyl alcohol is separated, washed with methanol, and dried. The dried product has an alkalinity of 125 and is of good color and stability.

Example 11

Polyvinyl alcohol is held in contact with a bath of methanol, 70 parts, and water, 30 parts, having an alkalinity of 140. It is separated, washed once with methanol, and dried. The product has an alkalinity of 150 and good heat-stability.

Example 12

Polyvinyl alcohol 20 parts (dry weight), containing residues of methanol, 7.5 parts, and acid (as sulphuric acid) 0.075 part, is suspended in methanol, 30 parts, and water, 30 parts. The bath thus contains methanol and water in ratio 56:44. It is established and maintained at alkalinity of 80 by addition of sodium carbonate. The batch is stirred at room temperature for one hour. Then methanol, 60 parts, is added, making the ratio of methanol to water 76:24, and the polyvinyl alcohol is separated, washed with methanol, and dried. Its solubility, color and heat-stability are excellent. The alkalinity of the dried product is 76.

It will be understood that the above examples are merely illustrative and that the invention broadly comprises treating polyvinyl alcohol in the form of discrete particles in a bath comprising a lower aliphatic alcohol, separating the polyvinyl alcohol from the bath, and drying the polyvinyl alcohol, due regard being paid to the proportion of water, if any, in the bath and the alkalinity of the bath and any rinsing mixture that may be used, so that the alkalinity of the dried polyvinyl alcohol will fall within the limits specified.

It might be thought feasible to utilize as a foundation for the stabilizing bath the alcoholic liquor in which the polyvinyl alcohol has been prepared, but this is impracticable because its relatively large content of acid catalyst would lead to the formation, by neutralization, of a correspondingly large content of salt (e. g. sodium sulphate) in the product, and also because it contains methyl (or ethyl) acetate, which would be hydrolyzed in the step of stabilization. Accordingly, the polyvinyl alcohol will be separated from this liquor before being treated. Even the amount of such liquor which it retains after being filtered or centrifuged is preferably removed by rinsing the polyvinyl alcohol on the filter with methanol (or ethanol) before putting it into the bath.

The step of stabilization can be carried out effectively in a bath made up of a water-miscible alcohol other than methanol and ethanol, such as isopropanol. But in commercial practice this will be undesirable, since the preceding step of alcoholysis will have been carried out in methanol or ethanol, and residues of methanol or ethanol carried with the polyvinyl alcohol into a bath of a different alcohol would complicate the problem of distillation for recovery of the latter.

The invention provides an effective, simple and inexpensive method of neutralizing residues of catalyst in polyvinyl alcohol made by alcoholysis from a polyvinyl ester, and thus of stabilizing this product so that its color and solubility will not be impaired by heat at temperatures to which it will normally be subjected in subsequent processing.

As many apparently widely different embodiments of this invention may be made without departing from the spirit and scope thereof, it is to be understood that the invention is not limited to the specific embodiments thereof except as defined in the appended claims.

I claim:

1. Process of stabilization of polyvinyl alcohol which comprises treating said polyvinyl alcohol in the form of discrete particles, with a bath essentially comprising a lower aliphatic saturated monohydric alcohol and not in excess of 60%, by weight of said bath, of water, separating said polyvinyl alcohol from said bath while the latter contains at least 65% of said lower aliphatic alcohol, and drying said polyvinyl alcohol, the alkalinity of said bath being such that the resulting dried polyvinyl alcohol has an alkalinity between (A) as determined by the formula—

$$\text{Log } A = 2.48 - 0.008 W$$

wherein W is the percent by weight of water in the bath, and 75, and the alkalinity of said bath being produced by hydroxyl ions resulting from solution therein of an alkaline substance selected from the hydroxides of sodium and potassium and their salts with weak acids.

2. Process of stabilization of polyvinyl alcohol which comprises treating said polyvinyl alcohol in the form of discrete particles, with a bath essentially comprising a lower aliphatic saturated monohydric alcohol and not in excess of 35%, by weight of the bath, of water, separating said polyvinyl alcohol from said bath, and drying said polyvinyl alcohol, the alkalinity of said bath being such that the resulting dried polyvinyl alcohol has an alkalinity between (A) as determined by the formula—

$$\text{Log } A = 2.48 - 0.008 W$$

wherein W is the percent by weight of water in the bath, and 75, and the alkalinity of said bath being produced by hydroxyl ions resulting from solution therein of an alkaline substance selected from the hydroxides of sodium and potassium and their salts with weak acids.

3. Process of stabilization of polyvinyl alcohol which comprises treating said polyvinyl alcohol in the form of discrete particles, with a bath essentially comprising a lower aliphatic saturated monohydric alcohol having from 1 to 2 carbon atoms, inclusive, and not in excess of 35%, by weight of said bath, of water, separating said polyvinyl alcohol from said bath, rinsing said polyvinyl alcohol with a mixture essentially comprising one of said lower aliphatic alcohols and not in excess of 35%, by weight of said mixture, of water, and drying said polyvinyl alcohol, the alkalinity of said bath and said rinsing mixture being such that the resulting dried polyvinyl alcohol has an alkalinity between (A) as determined by the formula—

$$\text{Log } A = 2.48 - 0.008 W$$

wherein W is the percent by weight of water in the bath, and 75, and the alkalinity of said bath and said rinsing mixture being produced by hydroxyl ions resulting from solution therein of an alkaline substance selected from the hydroxides of sodium and potassium and their salts with weak acids.

4. Process of stabilization of polyvinyl alcohol which comprises treating said polyvinyl alcohol in the form of discrete particles, with a bath essentially comprising a lower aliphatic saturated monohydric alcohol having from 1 to 2 carbon atoms, inclusive, and from 10% to 20%, by weight of said bath, of water, separating said polyvinyl alcohol from said bath, and drying said polyvinyl alcohol, the alkalinity of said bath being such that the resulting dried polyvinyl alcohol has an alkalinity between 100 and 80 and the alkalinity of said bath being produced by hydroxyl ions resulting from solution therein of an alkaline substance selected from the hydroxides of sodium and potassium and their salts with weak acids.

5. Process of stabilization of polyvinyl alcohol which comprises treating said polyvinyl alcohol in the form of discrete particles, with a bath essentially comprising a lower aliphatic saturated monohydric alcohol having from 1 to 2 carbon atoms, inclusive, and from 10% to 20%, by weight of said bath, of water, separating said polyvinyl alcohol from said bath, rinsing said polyvinyl alcohol with a mixture essentially comprising one of said lower aliphatic alcohols and not in excess of 35%, by weight of said mixture, of water, and drying said polyvinyl alcohol, the alkalinity of said bath and said rinsing mixture being such that the resulting dried polyvinyl alcohol has an alkalinity between 100 and 80 and the alkalinity of said bath and said rinsing mixture being produced by hydroxyl ions resulting from solution therein of an alkaline substance selected from the hydroxides of sodium and potassium and their salts with weak acids.

6. Stabilized polyvinyl alcohol characterized by remaining substantially colorless upon being heated in air at 135° C. for sixteen hours, said polyvinyl alcohol being obtained by the process set forth in claim 1.

GELU STOEFF STAMATOFF.